Figure 1:
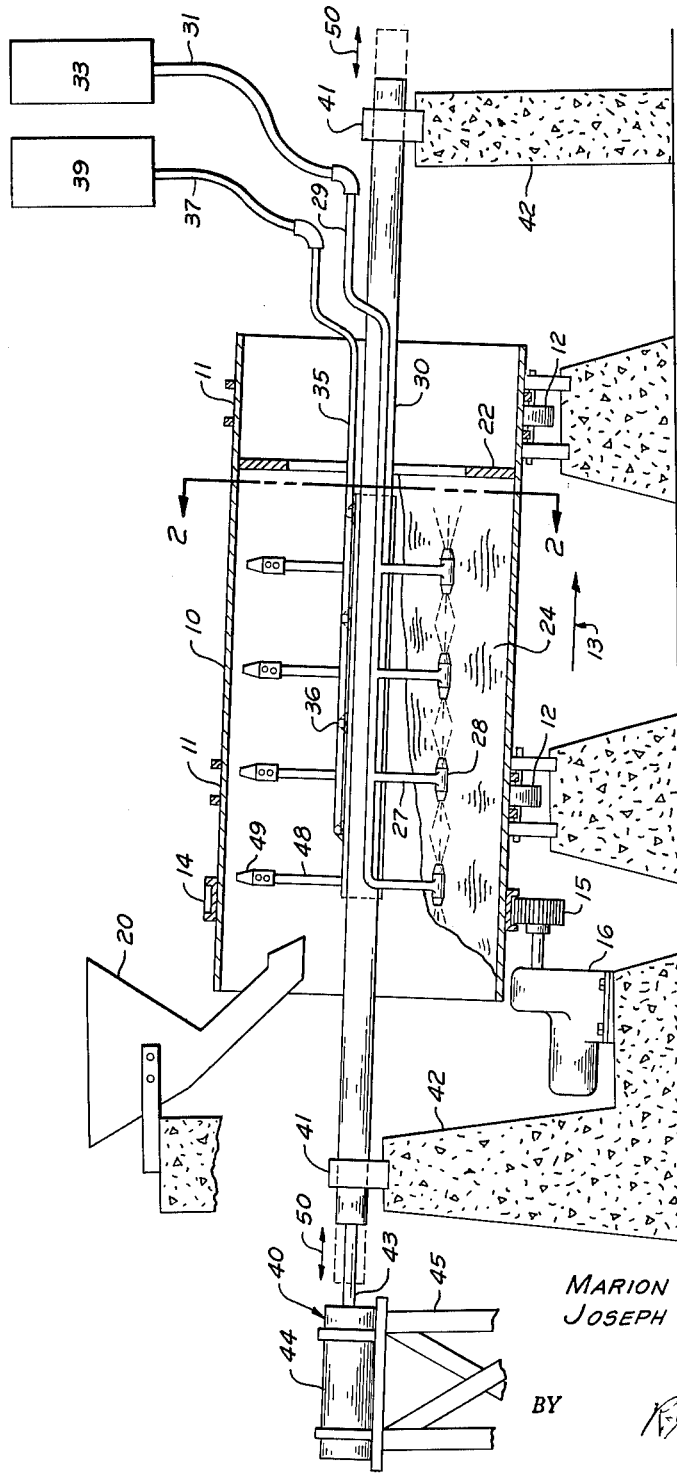

March 22, 1966 M. D. SANDERS ETAL 3,241,945
METHOD AND APPARATUS FOR PRODUCING GRANULATED SOLIDS
Filed March 19, 1963 2 Sheets-Sheet 1

MARION D. SANDERS
JOSEPH P. KEALY
INVENTORS.

BY R.J.Story
ATTORNEY.

ammoniating solution is poor, overconcentration can occur. When this happens, the overconcentrated area does not contain all the solids to make a designated grade and the heat of reaction is not spread evenly throughout the entire substrate. Higher local temperatures are then produced and these temperatures are detrimental to ammonium nitrate and potassium chloride. This is especially true when sulfuric acid is used, because this acid reacting with ammonia generates the most heat of reaction of any of the common chemicals used in plant food manufacture.

United States Patent Office 3,241,945
Patented Mar. 22, 1966

3,241,945
METHOD AND APPARATUS FOR PRODUCING GRANULATED SOLIDS
Marion Dwight Sanders, Chesterton, Ind., and Joseph Peter Kealy, Calumet City, Ill., assignors to Swift & Company, Chicago, Ill., a corporation of Illinois
Filed Mar. 19, 1963, Ser. No. 266,276
6 Claims. (Cl. 71—41)

The present invention relates in general to an improved process and apparatus for the manufacture of certain salts produced by contacting acids with alkalis, particularly such salts as may be utilized as fertilizer additives.

More specifically, the invention described below is especially applicable to the in situ production of ammonium sulfates, phosphates, and nitrate which are utilized as fertilizer additives.

In the process of mixing dry materials, both reactive and nonreactive, with liquids, both reactive and nonreactive, the problem of local overconcentration of liquids is always present. The means to overcome this problem has included many types of spraying and distribution systems. In the case of rotary cylindrical batch mixers, one or two spray points or a spray pipe with many orifices have been utilized. In such a system, lifting flights are utilized so as to present new increments of solids to the liquids.

With the advent of granulation of solids, a rolling, cascading action was needed so that lifting flights where removed. A popular modern type of mixer and reactor is the inclined, continuous tube, affording a large cascading bed of dammed-up solids developed by a circular dam near the discharge end onto which and into which liquids are sprayed or injected from multiple-spray orifices. But even in this case, solids build up at the injection points under the bed of cascading solids or on the walls of the tube. Also, maldistribution of reacting acids and alkalis, such as ammonia or ammonia-containing liquids on the cascading or rolling solids causes local wet areas, which result in "mud balls." These "mud balls," due both to their size and their incompletely reacted interior, usually clog the equipment, and when ammonia or ammoniating solutions are used, cause excessive loss of gaseous ammonia due to lack of penetration into the "mud balls."

Furthermore, in the fertilizer industry, one of the most commonly used nitrogen-supplying sources is a solution of ammonia-ammonium nitrate. Such fertilizer ammoniating solutions are usually prepared by neutralizing nitric acid with excess ammonia to form a concentrated ammonia-ammonium nitrate water solution. The ammonia-ammonium nitrate solutions are combined with acid-reacting phosphate solids by simply spraying the solution onto the tumbling solids in the mixer. Generally, the ammonia solution is added in such a quantity that the free ammonia reacts with the calcium dihydrogen phosphate in the acid-reacting phosphate solids to form calcium hydrogen phosphate and ammonium phosphate. If more than a stoichiometric amount of ammonia is added, the undesirable insoluble tricalcium phosphate is formed. Since this limits the amount of nitrogen which can be added to acid-reacting phosphate solids, acid substances are added to said acid-reacting phosphate solids to react with additional free ammonia and thereby increase the nitrogen to $P_2O_5$ ratio in the fertilizer product. However, if the distribution of the added acid and The undesirable high temperatures along with the overconcentration of sulfuric acid in localized areas break down the nitrate salt into oxides of nitrogen, which escape as a gas. Also, at these high temperatures, the sulfuric acid attacks potassium chloride, which is the usual source of potassium in mixed fertilizers, to produce potassium sulfates and gaseous hydrogen chloride. The hydrogen chloride, in turn, reacting with the free ammonia present forms ammonium chloride which, going off as an aerosol, contributes to further nitrogen loss. In addition, this ammonium chloride aerosol is quite difficult to knock down in the scrubbers.

It is readily apparent that a process which avoids any local overconcentration of reactants would be most welcome in the fertilizer industry. Accordingly, it is an object of this invention to provide a novel, commercially feasible method and apparatus for the neutralization of acids with bases to form salts in the presence of solids, without local overconcentration of reactants.

Another object is to provide a method and apparatus whereby subbstantially all of the alkaline substance originally introduced may be recovered as a salt product.

An additional object of this invention is to provide a method and apparatus which, is particularly adaptable for use in conjunction with a rotary drum-type fertilizer mixer, or a continuous rotary granulating tube and avoids substantial nitrogen loss.

A still further object is to provide such even distribution of reacting acids and alkalis such as ammonia or ammonia-containing liquids that the formation of "mud-balls" is substantially avoided.

Additional objects, if not specifically set forth herein, will be readily apparent to those skilled in the art from the detailed description of the invention which follows.

In general, the process of this invention comprises the steps of forming a rolling, cascading bed of fertilizer solids flowing in a given direction; evenly contacting the solids with a reciprocating, acidulating medium comprising an acid, such as, sulfuric acid, phosphoric acid, nitric acid or any mixture of the three acids; injecting alkali fluids in a reciprocating manner beneath the bed of solid particles in a quantity sufficient to substantially neutralize the acid introduced onto the bed; withdrawing fertilizer solids and the in-situ-produced salts from the drum; cooling and sizing the withdrawn material and recycling the fines to the drum at a given rate.

In order to carry out the process of this invention, we have devised a reciprocating injection assembly for introducing fluids beneath and onto a rolling bed of solids in a rotating drum and simultaneously scraping the inside of said drum with a reciprocating scraper assembly. The particular apparatus is most advantageously employed in the production of high-grade, granular fertilizer solids; however, its application to other fields will be quite apparent to those skilled in solid-liquid distribution reaction systems.

The apparatus described below insures a distribution of the fluids onto and within the rolling bed of solids so as to obtain even distribution and avoid any local overconcentration of reactants. Specifically, such apparatus permits neutralization of the introduced acid before said acid can react with any substantial amount of ammonium nitrate or potassium chloride present since contact between the reactants is rapid and uniform. With such an apparatus, very little, if any, nitrogen is lost via ammonium chloride aerosol, nitrate decomposition, or volatilization of un-reacted ammonia.

Figure 2:
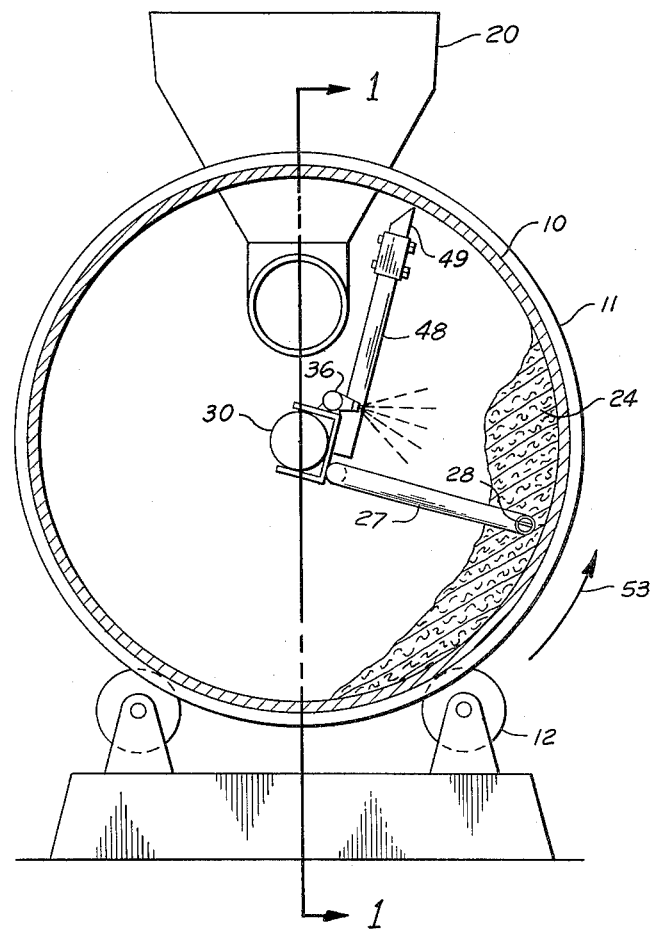

A complete understanding of the invention will be attained by reference to the following description and drawing in which:

FIGURE 1 is a sectional side elevation view of a rotating drum reactor embodying the present invention; and FIGURE 2 is a cross-sectional view of the apparatus taken at line 2—2 of FIGURE 1.

In general, the process of the present invention concerns the neutralization of acids with alkali in the presence of solids. Specifically, phosphoric acid, including the high $P_2O_5$ content acids known as superphosphoric acid, sulfuric acid, nitric acid and mixtures thereof, are neutralized by reaction with an ammonia supplying source, such as liquid anhydrous ammonia or a solution of ammonia-ammonium nitrate and/or urea, in the presence of fertilizer solids. Other liquids may be included in the formulation that are solutions or melts of neutral salts such as the common 83% $NH_4NO_3$ solution. The fertilizer solids contain acid reacting phosphate solids and usually potash, however, urea, ammonium nitrate, ammonium sulfate, urea-form solution, potassium nitrate, sulfate of potash, muriate of potash, monopotassium phosphate, mono- or diammonium phosphate, as well as chelating agents and other plant nutrients may be present. Also, the solids fed to the reactor to form the rolling bed on which the salts are deposited may be made up entirely of recycled material such as diammonium phosphates which are made from wholly liquid materials such as phosphoric acid and ammonia. The fertilizer solids are charged into a rotary type mixing drum by any suitable means such as by gravity through a hopper or by a feeder comprising a screw conveyor. The solids form a rolling, cascading bed and, since the drum is inclined in the direction away from the point of charge, the particles tumble in said direction.

While the fertilizer particles flow downstream, a liquid or gas containing free ammonia, preferably anhydrous ammonia or a fertilizer ammoniating solution, is injected underneath the bed of solids in a reciprocating manner. Simultaneously with the ammonia treatment is the coating of the solid particles accomplished by spraying acid onto the solids, both treatments being accomplished continuously across a plurality of reciprocating paths. Neutral liquids, such as the aforementioned 83% ammonium nitrate may be sprayed in a reciprocating manner either on or under the rolling bed. Also simultaneously with the injection of the amnonia substance beneath the solids is the local agitation of the solids along the path of injection.

Both the acid and base appear to thoroughly and uniformly saturate the surface of the solids due to the fact that very little if any local overconcentration of reactants takes place. The reciprocation of both acid and alkali injection mechanisms insures that new increments of solids and reactants come together creating an even distribution of all compounds present.

If a solution containing ammonium nitrate and free ammonia is used, the latter reacts with sulfuric acid to form ammonium-hydrogen sulfate and/or diammonium sulfate without the ammonium nitrate breaking down to gaseous oxides of nitrogen. Furthermore, even though potassium chloride is present in the solids, very little hydrochloric acid is evolved. Since by the broad distribution of reactants overconcentration and excessive heat of reaction is avoided and the sulfuric acid reacts virtually completely with the ammonia present. Of course, when phosphoric acid is introduced, the ammonia also reacts therewith to form mono- and diammonium phosphate. Also, in this instance, due to even distribution of reactants, very little free ammonia is lost.

It has been found that the present invention produces an excellent plant food product when superphosphoric acid (an anhydrous mixture of ortho phosphoric acid and various dehydrated phosphoric acids, such as pyro- and meta-phosphoric acids, etc.) is utilized. A specific embodiment comprises the manufacture of mixed plant foods by combining a free ammonia supplying source with superphosphoric acid under essentially anhydrous conditions. The plant food product formed from superphosphoric acid and ammonia, when formed according to the present invention, along with other soluble plant food ingredients as desired, is substantially moisture-free and resistant to caking. Due to the fact that the product possesses freedom from caking, coating or conditioning agents which are normally added as anticaking agents may be omitted. This is quite advantageous when a water-soluble product is desired inasmuch as coating agents such as finely ground clays are usually insoluble and contribute to the insoluble residue remaining when the product is placed in solution.

In a preferred embodiment of the invention, superphosphoric acid containing between 64–81% and preferably 68–77% available $P_2O_5$ is reacted with free ammonia, ammonia-ammonium nitrate solutions and/or ammonia-urea solutions in the above described manner. Preference is given to solutions that insure that not more than about 6 or 7% water is present based on total weight of solids.

The nitrogen-supplying ingredients, supplementing the ammonium phosphate and sulfate produced in the reaction zone, are usually anhydrous ammonia, ammonium nitrate, mono- and diammonium phosphate and urea, etc. As mentioned earlier, other plant food salts such as potassium phosphate and potassium chloride may be present.

The fertilizer solids are charged into the reaction zone by any suitable means and tumbled. The superphosphoric acid is usually heated to between 100°–200° F. to reduce its viscosity and is introduced into the reaction zone by means of reciprocating acid sprays while the solids are being tumbled. Simultaneously with the spraying of the acid is the injection of the ammonia-containing reactant beneath the bed of solids, in approximately stoichiometric amounts, also in a reciprocating manner. As the materials react, heat is evolved, and the solubility of most of the ingredients is increaesd. The liquid phase of the mixture increases and the product which is formed becomes granular. The product is discharged from the reaction zone and is cooled, classified and the fines recycled. The recycled fines provide agglomeration centers upon which the mono- and diammonium phosphate, ammonium sulfate and other in situ salts substances deposit. The sirupy nature of the superphosphoric acid also aids in the granulation of the fines as it picks them up.

Utilizing reciprocating spray injection of acids and the under-the-bed injection of alkaline substances produces an onsize product with less recycling of fines. This action, in conjunction with the rolling bed of solids flowing in a given direction through the reaction zone, avoids the formation of a heavy slurry, mud or "mud balls" as would result in a stationary injection system.

Referring now to the drawings, the apparatus of the present invention comprises an open end cylindrical drum 10 having a plurality of tracks 11 about its periphery. The tracks 11 ride on a plurality of rollers 12. The rollers are mounted so that drum 10 is inclined downwardly in the direction indicated by arrow 13. A ring gear 14, encircling drum 10 and engaged by a pinion gear 15 on the output shaft of a suitable power source 16, is used to rotate the drum.

A suitable feeder such as a hopper 20 is utilized to introduce the fertilizer solids into drum 10. The hopper 20 is fed by any suitable means such as a conveyor (not shown). When the drum 10 rotates, the solids will be carried up the side of the drum to a certain height (depending upon the speed of rotation, etc.) and will then fall back to the bed in the drum. The fertilizer solids in addition to being tumbled will move in the direction of arrow 13 because of the slope of the drum.

Downstream from the point of charge in a ring 22 forming a dam for solids 24. Between the ring forming the dam and hopper 20 is one or more injector probes 27 generally for injecting fluids in a reciprocating manner beneath the solids. Each injector includes a T nozzle 28 connected to a supply manifold 29. The fluid injector probes 27 and T nozzles 28 are positioned so the latter are always beneath the bed of solids. It is preferred to have the injectors positioned about 60 degrees from vertical in the direction of drum rotation and in the lower portion of the drum as shown in FIGURE 2. Injectors 27 and manifold 29 are secured rigidly to a reciprocable member such as a shaft 30. Manifold 29 connects with flexible tube (or hose) 31. The flexible tube 31 in turn is connected to an alkali source 33. Valves and meters (not shown) are stationed between tube 31 and alkali source 33. Similarly an acid pipe 35, having one or more spaced spray heads 36 stationed along its length within the drum, is secured rigidly to shaft 30. Acid pipe 35 communicates with a flexible hose 37. The flexible line 37 in turn is connected to an acid source 39 and stationed therebetween are valves and meters (not shown).

Shaft 30 is reciprocally mounted at both ends in bearings 41 which in turn are mounted on supports 42. A suitable reciprocating drive means 40 is connected to one end of the shaft. One such means illustrated in FIGURE 1 consists of a pneumatic cylinder 44, the piston 43 of which is secured to the higher end of shaft 30. The pneumatic cylinder is mounted upon a fixed support 45. The shaft is so positioned as to be substantially axial to the drum.

The shaft 30 also carries one or more elongated bars 48 which extend upwardly toward the inner face of drum 10. It is preferred to have bars 48 inclined approximately 30 degrees from vertical opposite the direction of drum rotation and in the upper half of the drum as shown in FIGURE 2. Secured rigidly to bars 48 are scrapers 49 which thoroughly scrape the inside of the drum.

Reciprocable movement, in the direction shown by arrows 50 is imparted to shaft 30 by means of an air or hydraulic cylinder 44. Since manifold 29, pipe 35 and bars 48 are securely attached to shaft 30, they are thereby also reciprocated in conjunction with said shaft upon the activation of the cylinder.

The reciprocation of the injection means along with the scraper assembly is designed to prevent local overconcentration of reactants. In addition, with a stationary injection system, one could never be sure that the many small injection holes would all remain open during a production run. An additional advantage of the reciprocating mechanism over a stationary pipe is that any lump formations can ride out of the drum and not be caught under the pipe. Lump formations in stationary systems have been known to bend and even tear out the injection system. However, with the injection probes moving back and forth, the lumps cannot be caught and they are just pushed aside until they work their way out of the drum. Furthermore, stationary injection systems are not satisfactory when sulfuric, phosphoric, super-phosphoric acid or other acids is utilized because of high ammonia losses. However, the use of reciprocating injection means reduces ammonia losses substantially as will be shown in the examples set forth later.

In carrying out the process of the invention, the apparatus is operated as follows: Power source 16 is activated to rotate the drum in the direction indicated by arrow 53 (FIGURE 2) and cylinder 44 is energized to reciprocate shaft 30 as well as injectors 27, acid sprays 36 and scrapers 49. Fertilizer solids are charged into the drum 10 through hopper 20. These solids comprise acid reacting phosphates such as superphosphates, triple superphosphates, and potassium chloride, along with other ingredients if desired.

Alkaline fluids such as anhydrous ammonia is metered out of source 33, flows through flexible line 31, manifold 29, injectors 27, and is dispensed underneath the bed of solids by passing out through the T nozzles 28. Simultaneously therewith, acid reactant, such as, sulfuric acid, phosphoric acid, or superphosphoric acid, is metered out of source 39, flows through flexible line 37 and pipe 35 and is sprayed upon the fertilizer solid particles by exiting through acid sprays 36. As the solids move down stream, due to the inclined position of the drum, they are coated with an excellent distribution of the acid which in turn is also neutralized by the evenly distributed alkaline reactant. The solids continue to flow downstream, reach and overflow dam 22, and eventually exit the drum at its lowest point. The solids are caught on a conveyor system (not shown) where they cool and are sized. Particles which are oversize are then run through an impact mill to decrease their diameter and may be recycled along with the fines through the apparatus.

The particular process insured a distribution of the acid and base onto and within the rolling cascading bed of solids so as to obtain an even distribution of reactants thus avoiding any local overconcentration of said reactants. The process permits neutralization of the introduced acid before the acid reacts, to any substantial degree, with the ammonium nitrate of potassium chloride present. By so doing, very little, if any, nitrogen is lost via ammonium chloride aerosol, nitrogen oxides, free ammonia or otherwise. Also, as the drum rotates, the reciprocating scrapers scrape the inside of the drum and remove any particles which tend to stick therein. The small surface area of the scrapers is incapable of gathering large amounts of material and hence does not impart an excessive drag upon the drum. However, even though the scrapers are relatively small in surface area, they do an efficient job of scraping due to the fact that they are reciprocated.

The specific examples that follow are purely for illustrative purposes and are not to be construed as imposing limitations on the scope of the invention other than are set forth in the appended claims.

*Example I*

A mixture of triple superphosphate, 11.4 lbs. per minute, and potash (KCl), 45.9 lbs. per minute, was charged continuously into a rotating, inclined drum. Superphosphoric acid of 70% $P_2O_5$ at 160° F. was sprayed at the rate of 32.1 lbs. per minute onto the rolling, cascading bed of solids by means of the reciprocating acid sprays. Introduction of the superphosphoric acid to the drum was started after about 5 minutes feeding of the dry solids. About 30 seconds after the introduction of the superphosphoric acid, 9.1 lbs. per minute of anhydrous ammonia was reciprocably injected under the rolling bed of solids. Once started, the holdup of 50 lbs. is about 5 minutes and with a recycle of .67 to 1, the reaction time was considered to be about 3 minutes. The product was almost perfectly granular in form and on size. It was passed to a series of screens on which an oversize fraction retained on a 6-mesh screen and a fine fraction passing through a 10-mesh screen were separated from an intermediate product fraction. The oversize fraction was crushed in a hammer mill and combined with the fine fraction to make up the required recycle material for return to the drum.

The following examples and data are given to show that nitrogen loss was reduced considerably with less recycle when the ammonia or ammoniating solution was injected by reciprocating sprays under the bed of solids in contrast to a stationary injection system.

*Example II*

GRADE: 7-28-28

| Formula | Stationary Injection of $NH_3$ | | Reciprocating Injection of $NH_3$ | |
|---|---|---|---|---|
| | Lbs./Ton | Units N | Lbs./Ton | Units N |
| Superphosphoric Acid (70% $P_2O_5$) | 642 | | 648 | |
| Anhydrous Ammonia (82.25% N) | 182 | 7.48 | 170 | 6.99 |
| Triple Superphosphate (46% $P_2O_5$) | 228 | | 215 | |
| Potash (KCl) (61% $K_2O$) | 918 | | 920 | |
| Water | 91 | | None | |
| | 2,061 | | 2,003 | |
| Recycle Rate | 1:1 | | 0.67:1 | |
| Analysis of Product: | | | | |
| Total Nitrogen | 5.88 | | 7.04 | |
| Available Phosphoric Acid | 26.52 | | 22.78 | |
| Potassium Oxide | 29.16 | | 30.88 | |

As can be seen in the above, even with an overage of nitrogen from anhydrous ammonia of 0.5 unit, the nitrogen in the product was 1.10 units low. This is a total loss of 1.60 units or 39 lbs./ton of ammonia. When the same grade was made with the reciprocating injection of $NH_3$, no overage was used; that is, 170 lbs. of $NH_3$ is equal to 140 lbs. of nitrogen or 7 units and the nitrogen was up to grade.

*Example III*

GRADE: 15-15-15

| Formula | Stationary Injection of $NH_3$ | | Reciprocating Injection of $NH_3$ Solution | |
|---|---|---|---|---|
| | Lbs./Ton | Units N | Lbs./Ton | Units N |
| Superphosphoric Acid (70% $P_2O_5$) | 442 | | 429 | |
| Solution 441 (a solution of about 23.8% $NH_3$, 69.8% $NH_4NO_3$ and about 6.4% $H_2O$) | 404 | 8.9 | 375 | 8.25 |
| Potash (KCl) (61% $K_2O$) | 492 | | 492 | |
| Ammonium Sulfate (20% N) | 682 | 6.8 | 700 | 7.00 |
| | 2,020 | 15.7 | 1,996 | 15.25 |
| Recycle Rate | 1:1 | | 0.75:1 | |
| Analysis of Product: | | | | |
| Total Nitrogen | 13 | | 14.75 | |
| Available Phosphoric Acid | 15 | | 16 | |
| Potassium Oxide | 15 | | 16 | |

With the stationary injection, 2.7 units of N were lost as ammonia or 65 lbs./ton whereas with the reciprocating injection only 0.50 unit of N were lost as ammonia or 12 lbs./ton.

The above four test runs show that loss of nitrogen was reduced and with less recycle when injecting ammonia or ammoniating solution by reciprocating nozzles under the bed of solids as compared to a stationary injection system. One of the other points, as far as obtaining a granular product is concerned, is the fact that the above type formulas need to be granulated on the fine side with a stationary type system, whereas with the reciprocating injection system the mix could be kept closer to the granulating point without danger of ammonia loss or momentarily mudding up. Thus more of the product is onsize, also resulting in greater throughput as can be seen by the lower recycle rate in both examples.

While the process of the instant invention is mainly directed to the production of mixed fertilizers, i.e., ammoniated inorganic acids in conjunction with nitrogen containing salts along with potassium salts, it should be noted that the invention is not so limited. The invention provides a means for producing in-situ salts while using the salt per se as the building medium. In such a case, the salt to be produced is used as the rolling, cascading bed of solids. The following example is another illustration of the invention and shows that ammonia-containing salts may be produced, with considerable less nitrogen loss, when the ammoniating solution is injected by reciprocation under the bed of solids in contrast to stationary injection.

*Example IV*

GRADE: 18.05-46.7-0

Various runs were made, using both stationary and reciprocating injection of anhydrous ammonia, at a neutralization rate of 7.8 lbs. of ammonia nitrogen per unit of $P_2O_5$.

Formula: Lbs./ton
Wet process phosphoric acid (50.66% of $P_2O_5$) ------------------------------ 1840
Anhydrous ammonia (82.25% N) ---------- 440
Less $H_2O$ (2% in grade) ------------------ 280
                                                                        ————
                                                                        2000

In order to provide sufficient solids upon which the diammonium phosphate builds, 80% of the product was recycled to the mixing reactor. That is, the recycle rate was 4:1.

Analysis of the recycle: Units
Total nitrogen --------------------------- 16.20
Available phosphoric acid --------------- 41.67

Neutralization rate was 7.775 lbs. of ammonia nitrogen per unit of $P_2O_5$.

ANALYSIS OF PRODUCT

| | Stationary Injection of $NH_3$ | Reciprocating Injection of $NH_3$ |
|---|---|---|
| Total Nitrogen | 15.64 units | 15.60 units. |
| Available Phosphoric Acid | 43.87 units | 43.20 units. |
| Neutralization Rate (lbs. of N/unit of $P_2O_5$). | 7.130 | 7.222. |
| Recycle Neut. Rate—Product Neut. Rate. | 0.645 | 0.553. |
| Since the recycle is 4:1, the loss is 5 times the difference of the neutralization rates = | 3.225 lbs.N/$P_2O_5$ unit | 2.765 lbs. N/$P_2O_5$ unit. |
| Lbs. of N lost (lbs. of N/$P_2O_5$ × 46.7 units of $P_2O_5$) = | 151 lbs. of N | 129 lbs. of N. |

As can be seen from the above, using a stationary injection of anhydrous ammonia, the product was short 151 lbs. of nitrogen. When using a reciprocating injection of anhydrous ammonia, the product was short only 129 lbs. of nitrogen. The above tests clearly show that loss of nitrogen was reduced considerably when producing diammonium phosphate by the reciprocating injection of anhydrous ammonia.

Obviously, many modifications and variations of the invention as hereinbefore set forth may be made without departing from the spirit and scope thereof and, therefore, only those limitations should be imposed as are indicated in the appended claims.

We claim:

1. In a process for the manufacture of mixed fertilizers wherein inorganic salts are formed in situ and admixed with fertilizer solids, the improvement comprising: forming a stream of rolling, cascading fertilizer solids flowing through a reaction zone, distributing a mineral acid onto the surface of said solids in a reciprocating spray path substantially parallel to the path of said flow, introducing alkaline fluids beneath the surface of said solids in a reciprocating path substantially parallel to the path of said flow, and recovering fertilizer solids in admixture with the in-situ-produced inorganic salts.

2. A process for the production of mixed fertilizers which comprises: maintaining a bed of rolling, cascading fertilizer solids flowing through a reaction zone, distributing a mineral acid onto the surface of said solids in a reciprocating spray path substantially parallel to the path of said flow, introducing an ammonia-supplying source beneath the surface of said solids in a reciprocating path substantially parallel to the path of said flow, and recovering the mixed fertilizer product.

3. A process for the production of mixed fertilizers which comprises: forming a stream of rolling, cascading fertilizer solids flowing through a reaction zone, distributing a phosphoric acid onto the surface of said solids in a reciprocating spray path substantially parallel to the path of said flow, introducing an ammonia-supplying source beneath the surface of said solids in a reciprocating path substantially parallel to the path of said flow, and recovering the mixed fertilizer product.

4. In a rotating drum-type mixer, wherein a bed of solids is tumbled, the combination of: an elongated drum having a cylindrical wall; means for mounting said drum for rotation about an axis concentric with said wall; a reciprocable assembly including: an elongated member extending substantially parallel along said axis of rotation within the drum, at least one fluid injection probe mounted longitudinally on said reciprocating member, and positioned to extend beneath the surface of said solids, and at least one spraying means positioned longitudinally along said reciprocating member for spraying fluid onto the surface of said solids; bearing means mounting said elongated member for reciprocation; and power means operably connected with said elongated member for reciprocating same.

5. In a rotating drum-type mixer, wherein a bed of solids is tumbled, the combination of: an elongated drum having a cylindrical wall; means mounting said drum for rotation about an axis concentric with said wall; a reciprocable injection assembly including: an elongated, reciprocable member, said elongated reciprocable member containing at least one downwardly-positioned injection probe extending below the surface of said solids, at least one spraying means positioned above said solids and longitudinally along said reciprocable member, and means for scraping the inner surface of said wall; bearing means mounting said elongated member for reciprocation in either direction along the longitudinal axis of said member; and drive means operably connected to said elongated member for reciprocating same alternately in said directions during rotation of the drum.

6. An apparatus for use in the manufacture of mixed fertilizers from fertilizer solids and fluids from a source thereof, which apparatus includes a rotating drum in which the solids form a rolling, cascading bed of fertilizer solids inclined against a bottom side of the drum as a result of the rotation of the drum, the improvement comprising: a reciprocable assembly including an elongated, reciprocable member positioned within and substantially parallel to the longitudinal axis of said drum; bearing means mounting said elongated member for reciprocation; scraper means attached to said reciprocable member and extending radially therefrom to engage the inner surface of said drum; injection probe means mounted on said member positioned downwardly so as to be partially beneath the bed of solids; spraying means attached longitudinally along said member for spraying fluids onto the surface of said solids; and power means operably connected with said elongated member for reciprocating same during the rotation of the drum.

References Cited by the Examiner

UNITED STATES PATENTS

| | | | |
|---|---|---|---|
| 502,766 | 8/1893 | Schreick | 239—142 |
| 2,741,545 | 4/1956 | Nielsson | 23—259.1 |
| 2,880,074 | 3/1959 | Carmichael | 23—259.1 |
| 2,945,747 | 7/1960 | Nielsson | 23—259.1 |
| 2,976,125 | 3/1961 | Buzzan | 23—259.1 |
| 2,979,421 | 4/1961 | Rissman et al. | 71—64 |

DONALL H. SYLVESTER, *Primary Examiner.*

ANTHONY SCIAMANNA, *Examiner.*